US008863082B2

United States Patent
Tsao et al.

(10) Patent No.: US 8,863,082 B2
(45) Date of Patent: Oct. 14, 2014

(54) TRANSFORMATIONAL CONTEXT-AWARE DATA SOURCE MANAGEMENT

(75) Inventors: Anson An-Chun Tsao, Redmond, WA (US); Yang Cao, Shanghai (CN); Pusheng Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 13/226,679

(22) Filed: Sep. 7, 2011

(65) Prior Publication Data
US 2013/0061208 A1 Mar. 7, 2013

(51) Int. Cl.
*G06F 9/44* (2006.01)
*G06F 9/445* (2006.01)

(52) U.S. Cl.
CPC .. *G06F 9/44* (2013.01); *G06F 8/71* (2013.01); *G06F 9/44505* (2013.01)
USPC .......................................................... 717/120

(58) Field of Classification Search
CPC .............. G06F 8/30; G06F 8/40; G06F 8/60; G06F 8/70; G06F 9/44
USPC .................. 717/106–108, 171–172, 120–121
See application file for complete search history.

(56) References Cited

U.S. PATENT DOCUMENTS

| | | | |
|---|---|---|---|
| 5,754,845 A | 5/1998 | White | |
| 5,920,721 A | 7/1999 | Hunter et al. | |
| 7,009,980 B1 | 3/2006 | Cao | |
| 7,543,282 B2 | 6/2009 | Chou | |
| 7,590,972 B2 | 9/2009 | Axelrod et al. | |
| 2005/0114369 A1 | 5/2005 | Gould et al. | |
| 2006/0259903 A1 | 11/2006 | Vernon | |

OTHER PUBLICATIONS

Chantry, "Mapping Applications to the Cloud", Jan. 2009, Microsoft Corporation, 14 pages.*
Singh et al., "Porting Google App Engine Applications to IBM Middleware", 2009, IBMCorporation, 6 pages.*
"Advantage with the Entity Framework", Retrieved at <<http://devzone.advantagedatabase.com/dz/content.aspx?Key=42&ID=71>>, Jul. 9, 2009, p. 1.
Christophe, "Executing the Same Code in All Environments: ODI Contexts", Retrieved at <<http://blogs.oracle.com/dataintegration/entry/executing_the_same_code_in_all>>, Apr. 27, 2009, pp. 13.

(Continued)

*Primary Examiner* — Ted T Vo
(74) *Attorney, Agent, or Firm* — Kevin Sullivan; Kate Drakos; Micky Minhas

(57) ABSTRACT

Porting between local, cluster, and cloud execution is aided by using the same source code for multiple data sources. A data source identifier recited in source code maps to data sources at different execution targets. Executable codes tailored to successive targets are produced using a resolution API without changing the developer's source code. An editable data source mapping is per-project, maintained in a file or project property, and placed in a distributable software package with executable code. Burdens on developers to determine execution targets in their source code and explicitly handle different execution locations in the source code are reduced. Source code can be freed of absolute path data source identifiers or code for detecting execution location. Source-to-source translation injects calls to create a folder, file, or cloud container. Data source resolution can be based on a relative path rooted at the data source identifier.

20 Claims, 2 Drawing Sheets

(56) References Cited

OTHER PUBLICATIONS

Tschudin, et al., "Harnessing Self-Modifying Code for Resilient Software", Retrieved at <<http://citeseerx.ist.psu.edu/viewdoc/download?doi=10.1.1.83.6998&rep=rep1&type=pdf>>, In the Proceedings 2nd IEEE Workshop on Radical Agent Concepts, Sep. 2005, pp. 1-8.

Sanchez, et al., "A Generic Context Management Framework for Personal Networking Environments", Retrieved at <<http://ieeexplore.ieee.org/stamp/stamp.jsp?tp=&arnumber=4205268>>, In the Proceedings of 3rd Annual International Conference on Mobile and Ubiquitous Systems—Workshops, Jul. 17-21, 2006, pp. 8.

T. Goud, Lepakshi, "Achieving Availability, Elasticity and Reliability of the Data Access in Cloud Computing", Retrieved at <<http://www.ijaest.iserp.org/archieves/9.1-A1-15-11/Vol-No.5-Issue-No.2/8.IJAEST-Vol-No-5-Issue-No-2-Achieving-Availability,-Elasticity-and-Reliability-of-the-Data-Access-in-Cloud-Computing-150-155.pdf>>, International Journal of Advanced Engineering Sciences and Technologies vol. No. 5, Issue No. 2, 2011, pp. 150-155.

"Cloud computing", Retrieved from <<http://en.wikipedia.org/wiki/Cloud_computing>>, Jul. 11, 2011, pp. 19.

"Computer cluster", Retrieved from <<http://en.wikipedia.org/wiki/Computer_cluster>>, Jul. 14, 2011, pp. 6.

"Environment variable", Retrieved from <<http://en.wikipedia.org/wiki/Environment_variable>>, Jun. 24, 2011, pp. 8.

"Libraries: frequently asked questions", Retrieved from <<http://windows.microsoft.com/en-US/windows7/Libraries-frequently-asked-questions>>, no later than Jun. 24, 2011, pp. 3.

"Overview of source to source translation strategies", Retrieved from <<http://www.antlr.org/wiki/display/CS652/Overview+of+source+to+source+translation+strategies>>, Mar. 24, 2008, pp. 2.

"Source-to-source compiler", Retrieved from <<http://en.wikipedia.org/wiki/Source-to-source_compiler>>, Apr. 26, 2011, pp. 3.

"Virtual Directory <virtualDirectory>", Retrieved from <<http://www.iis.net/ConfigReference/system.applicationHost/sites/site/application/virtualDirectory>>, no later than Jun. 24, 2011, pp. 7.

\* cited by examiner

_US 8,863,082 B2_

TRANSFORMATIONAL CONTEXT-AWARE DATA SOURCE MANAGEMENT

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A computer program that is tailored to run on a single machine can sometimes be modified by a developer to run instead on multiple machines, in order to take advantage of additional processing power and/or additional memory. For example, a developer may want to take a program that was originally written to execute on a single desktop computer and make it run instead on a group of computers such as a computing cluster, or a computing cloud. More generally, a developer may want to apply particular processing logic to process different data sources and not wish to expressly specify each data source as a parameter of the logic.

A computing cluster is a group of computers linked together through a fast local area network or other relatively fast communications mechanism. The computers within a cluster coordinate with one another to behave like a single powerful computer when viewed from outside the cluster.

A computing cloud is a shared networked pool of configurable computing resources (e.g., servers, storage, applications, and software services). The cloud's resources can be quickly made available to a user, and can be easily released, as computational demands by the user grow or shrink. Applications may be provided to a browser by a cloud server, so that no locally installed client copy of an application is needed.

Various definitions of cluster and cloud have been used. For purposes of the current discussion, a cluster includes less than a thousand processing cores and/or resides within a single building. A computing cloud, by contrast, includes a thousand or more cores, and/or resides in two or more buildings.

SUMMARY

Porting a program from a local execution context to cluster or cloud execution can involve tedious and error-prone source code changes, and more specifically, may involve changes to modify references to data sources used in the program. It can be very challenging for a developer to run a program against datasets of vastly different sizes. Some embodiments described here provide ways to increase program portability in ways that give access to a wide range of datasets, such as ways to automatically manage a single source code algorithm with multiple alternative computational data sources.

For example, in some scenarios a data source mapping exists in which a particular data source identifier is mapped to a plurality of data sources of substantially different sizes at respective execution targets, e.g., a few hundred gigabytes at a local machine, versus a few terabytes on a cluster, and dozens or hundreds of terabytes in a cloud. An embodiment receives source code which recites the data source identifier as a data source. After identifying a first execution target, the embodiment automatically produces from the source code a first executable code tailored to the first execution target. That is, upon execution in the first execution target, the executable will operate with the first execution target's mapped data source as the data source identified by the data source identifier. After identifying a second execution target, which has a different data source than the first execution target, the embodiment automatically produces—from the same source code—a second executable code tailored to the second execution target. That is, upon execution in the second execution target, the second executable will operate with the second execution target's mapped data source as the identified data source, instead of using the first execution target's data source. As noted, this port is achieved without requiring a developer to edit the source code.

In some embodiments, the data source mapping is maintained in a textual configuration file, and in some it is read from a nontextual project property, a project header, or another project-specific structure. In some embodiments, the data source mapping is placed in a distributable software package, thereby facilitating portability regardless of which execution location(s) are currently supported with executable code in the package.

An embodiment may reduce or eliminate the burden on developers to determine execution targets in the source code and to explicitly handle different execution locations in the source code. In some embodiments, for example, the source code is free of absolute path data source identifiers. An embodiment may provide agility to help a developer work through source code iterations quickly with a smaller subset of data locally on one machine, and then test a selected program iteration against larger data on a cloud or cluster.

Some embodiments utilize automatic source-to-source translation mechanisms to port the code. Porting a data source may encompass more than mere substitution of physical storage location identifier strings. For example, in some embodiments the automatic production of the second executable code from the same source code that led to the first executable involves a source-to-source translation which injects a call that was not present in the developer's version of the source, such as a folder creation call, a cloud container creation call, or a file creation call. Other mappings may involve database connections and not merely file based storage, e.g., mapping different data base servers such as local, enterprise, cloud servers, or development servers and production servers. Storage systems such as a file system (e.g., Windows® NTFS™ system) and cloud storage (e.g., Windows® Azure™ storage or other cloud storage) might have different storage structures, and some embodiments provide mappings among those structures (marks of Microsoft Corporation).

From a developer's perspective, some embodiments obtain a data source mapping in which a particular data source identifier is mapped to a plurality of data sources at respective execution targets. Then the embodiments automatically generate data source resolutions from the data source mapping and a source code, without requiring any change to the source code by the developer. Different data source resolutions correspond to different execution targets, e.g., to a particular cloud data source using a Universal Resource Identifier, or a particular cluster data source. Execution targets may be specified by the developer, or may be specified as defaults. In some embodiments, the data source resolution can be based on a relative path rooted at the data source identifier. Some embodiments will accept a modification of the data source mapping from the developer.

From an architectural perspective, some embodiments include a logical processor and a memory in operable communication with the logical processor. A data source mapping resides in the memory, and has a particular data source identifier which is mapped to a plurality of different data sources at respective different execution targets. The data source mapping may reside or persist, for example, in a textual configuration file, a nontextual project property, a project-specific structure, and/or a user-specific structure. A source code also resides in the memory, and the data source identifier is recited as a data source within the source code. An executable code producer residing in the memory has instructions which upon execution automatically produce at different times from the same source code a plurality of different executable codes, with each executable code making reference to a different one of the data sources.

In some embodiments, the source code is free of code for detecting execution location. In some, the source code is free of absolute path data source identifiers. Some embodiments include an executable code produced by the executable code producer, with the executable code containing injected code not present in the source code, e.g., a folder creation call, a cloud container creation call, and/or a file creation call.

In some embodiments, the executable code producer includes a resolution API. The resolution API includes instructions which upon execution by the processor will resolve a relative path and an execution target into a data source resolution containing a physical path. In some, the executable code producer includes a source-to-source translator. Different embodiments may take one or more overall approaches. In one approach, on a local machine the source code is translated to intermediate code (IC) or executable code (EC) for a specified execution target. Then the IC or EC is deployed and run on the execution target. In a second approach, the source code is first deployed to an execution target. A producer that is designed for that execution target will translate the code on the spot. In a third approach, the source code is translated as if the data is local relative to the code. Then when the code is deployed to an environment where data is in a remote location, a pre-task will download the data first, so that the code can access the local data.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
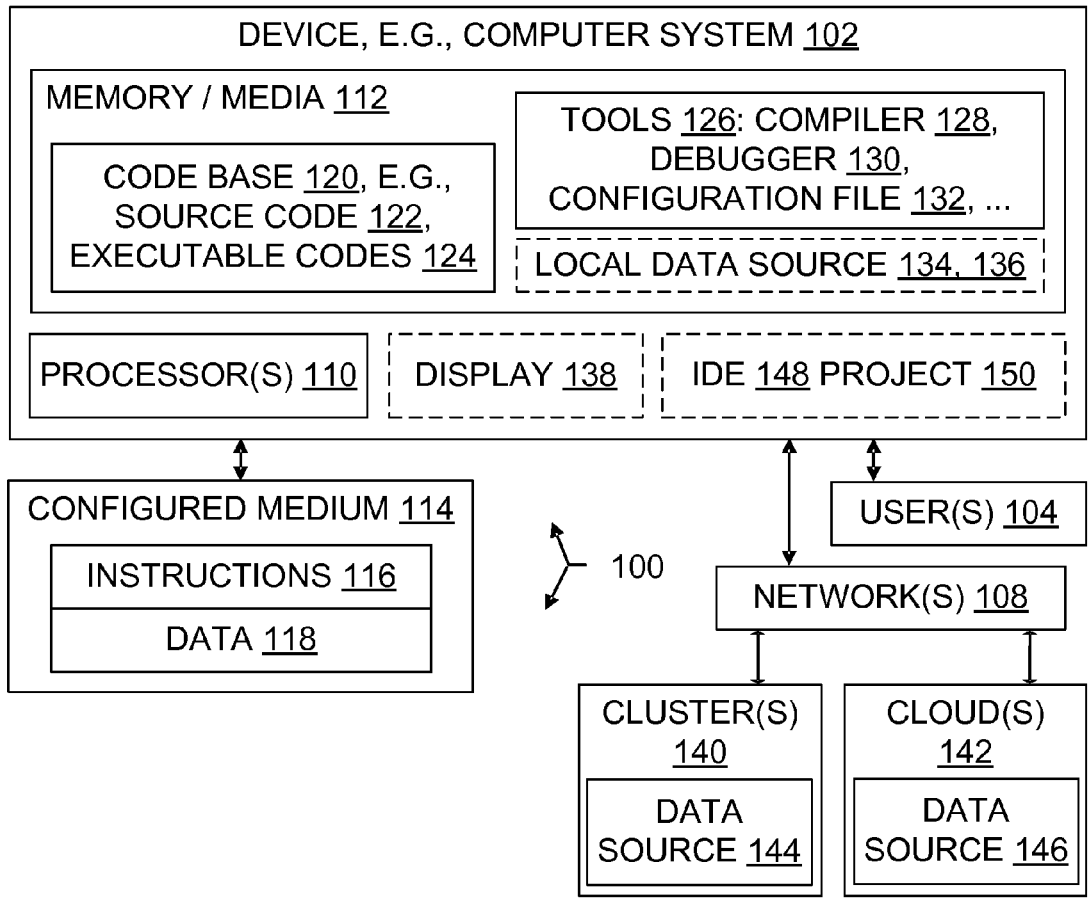
FIG. 1 is a block diagram illustrating a computer system having at least one processor, at least one memory, source code, and other items in an operating environment which will generally be present on multiple network nodes, and also illustrating configured storage medium embodiments.

With some fields facing a data explosion, it becomes beneficial to utilize more speedy and powerful processing of large and varied data sets, such as distributed processing in a cluster or a cloud. Traditional desktop and other single node computers are relatively limited in processing power and capacity to handle a large volume of data, so more developers and engineers wish to run their desktop applications on clusters or clouds, using larger data sets from different sources. For example, a developer may want to develop an algorithm on a local desktop using a small subset of data and then run that algorithm in the program against a cluster or cloud which contains a full set of data with the same format as the subset.

One resulting challenge is how to transition among different execution environments. Engineers may wish to use a different data source for each different execution environment, which can mean changing numerous data references before each deployment and execution. If the desired data is stored in different physical storage for different execution environments, the engineer may also be called on to change the source code, because different data providers frequently use different access methods. But a proliferation of versions and frequent changes makes code maintenance difficult, and raises the barrier for cluster or cloud adoption.

Fortunately, some embodiments described herein provide tools and techniques for coordinating a single source code with multiple data sources for different execution contexts. In some embodiments, context-aware data source/data provider abstraction mechanisms allow a user to avoid embedding express references to physical data sources such as local file systems, file shares, cloud storage, FTP addresses, particular databases, particular data streams, and so on. A project can automatically redirect a virtual reference to a particular data source depending on the execution location (e.g., local, cluster, cloud). Likewise, the user can virtualize data providers for data access. The project can then automatically tailor the executable code depending on the desired data storage.

Some embodiments provide a virtualization of physical data sources and their hierarchical structure. Some provide virtualization of different data access methods. Some map between a virtual reference and a physical data source for each execution location. Some automatically redirect a data reference and update data access methods, depending on the execution location.

In some situations, a major challenge faced by a developer is how to run a program developed on a single machine against a massive dataset which is well beyond the single machine's storage capacity. Some embodiments described here help developers explore an algorithm using a computer program with differently sized datasets, e.g., running the program first against a small subset on a single machine, and then moving to a full dataset in a seamless manner with the same development source code. As a result, shorter and cleaner code is possible, because developers can avoid writing code to detect execution location, and can use relative paths to access data. Source code maintenance can be easier, as only one copy of source code is tracked by the developer even though multiple execution locations are used. In some embodiments, the physical source is identified/updated in a single place, in a data source mapping. Smoother transitions among execution locations can be made, by avoiding changes to a data source each time one switches the execution location.

Some embodiments described herein may be viewed in a broader context. For instance, concepts such as source code, executable code, execution targets, data sources, and mappings may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving source code, executable code, execution targets, data sources, and/or mappings are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Executable code" means processor instructions, data (which includes constants, variables, and data structures), or both instructions and data, in a form other than a programming language.

"Source code" means statements, with optionally accompanying declarations and/or data, which are written in a computer programming language and designed to be used to automatically produce executable code.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)", "(es)", or "(ies)" means that one or more of the indicated feature is present. For example, "data source(s)" means "one or more data sources" or equivalently "at least one data source".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, containing, detecting, executing, generating, having, identifying, including, injecting, mapping, obtaining, operating, performing, placing, producing, reading, receiving, residing, resolving, substituting, transforming, or translating (or accepts, accepted, contains, contained, detects, detected, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, simply existing in a person's mind, or simply existing as a signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by injection, translation, resolution, binding, deployment, execution, modification, display, creation, loading, and/or other operations.

A code base 120 containing source code 122 and executable codes 124; development tools 126 such as compilers 128, debuggers 130, and configuration files 132; other software, a local data source 134 (data sources generally are designated at 136), and other items shown in the Figures and/or discussed in the text may reside partially or entirely within one or more media 112, thereby configuring those media.

In addition to processors(s) 110 and memory 112, an operating environment may also include other hardware, such as displays 138, buses, power supplies, and accelerators, for instance.

A device 102 may communicate over a network 108 with one or more computing clusters 140, and/or one or more computing clouds 142, which may each have their own respective data sources 144, 146, as well as their own processor(s), memory, and software. In some environments, the data sources on the cluster and the cloud are for datasets which are much larger than the local dataset. Indeed, the storage requirements for a cluster or cloud dataset could be well beyond the capacity of a local data source's data storage volume.

A given operating environment 100 may include an Integrated Development Environment (IDE) 148 or other software which provides a developer with a set of coordinated software development tools for software development projects 150. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use cluster computing, cloud computing, or both.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Figure 2:
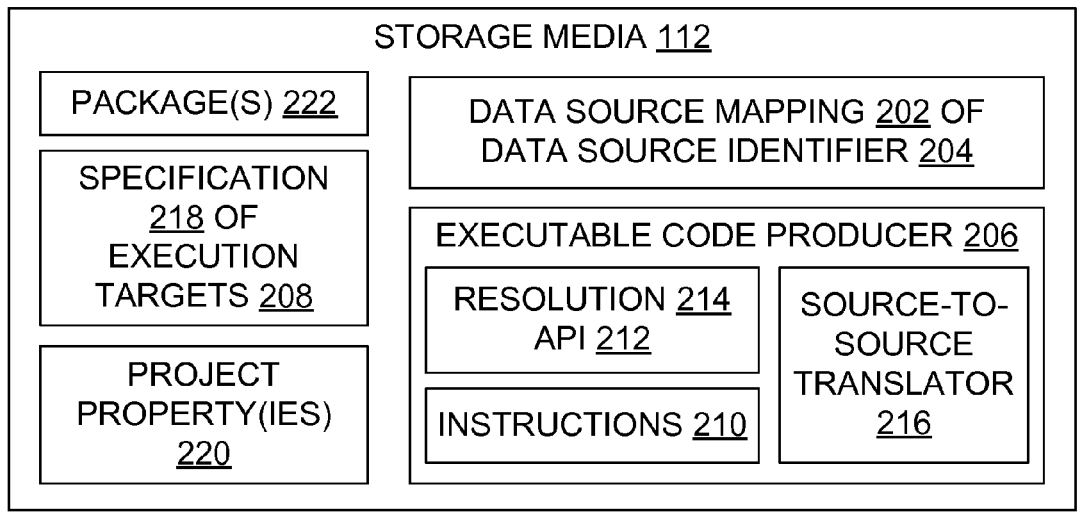
FIG. 2 is a block diagram illustrating transformational context-aware data-source management in an example architecture.

Systems FIG. 2 illustrates an architecture which is suitable for use with some embodiments. A data source mapping 202 maps a data source identifier 204, which is used in the source code 122, to respective data sources 136 such as a local data source 134, a cluster data source 144, and/or a cloud data source 146, as described further below. An executable code producer 206 uses the source code 122 and the data source mapping 202 to produce executable code 124 which is tailored to a particular execution target 208 (e.g., local, cluster, or cloud) with respect to specific data sources and access to them. The different data execution targets might contain different dataset sizes, such as different amounts of identically formatted data. For instance, a dataset's size might depend on the time period the data in the dataset represents, e.g., a month's worth of data on a local disk might occupy a few hundred gigabytes, while several years worth of data on cloud/cluster storage might occupy a hundred terabytes of storage. As another example, one of the data sources mapped to a data source identifier could contain less than ten gigabytes of data while another of the data sources mapped to the same data source identifier contains at least one hundred gigabytes of data. Other thresholds, such as a hundred gigabytes, or a terabyte, to name just two, could also be used. Regardless, in such situations, an embodiment can help make it easy for a developer to test identical development source code against multiple datasets, such as one that is relatively small and another that is relatively large.

The executable code producer contains instructions 210 to promote the production of tailored executables, above and beyond familiar instructions to achieve compilation and linking. For example, in some embodiments the producer 206 includes an API 212 which resolves data source identifiers 204 into physical locations (resolutions 214). In some, the producer 206 includes a source-to-source translator 216 which injects calls, declarations, and/or other code into the developer's source code 122 to obtain an intermediate source which is then compiled into execution-target-tailored executable code 124.

Although local, cluster, and cloud targets 208 are used as examples herein, a developer 104 may provide a specification 218 (e.g., by name, address, or other details) of different execution targets 208. For example, multiple clusters 140 could be specified in some embodiments, and clouds 142 might not be specified in some embodiments.

In some embodiments, a data source mapping 202 for one or more data source identifiers 204 is stored in a project-specific structure, such as in project properties 220 (which are also sometimes called attributes).

In some embodiments, a data source mapping 202 for one or more data source identifiers 204 is stored in a software package 222 with executable code 124, either in the form of properties 220 or in another form, such as a configuration file 132.

Figure 3:
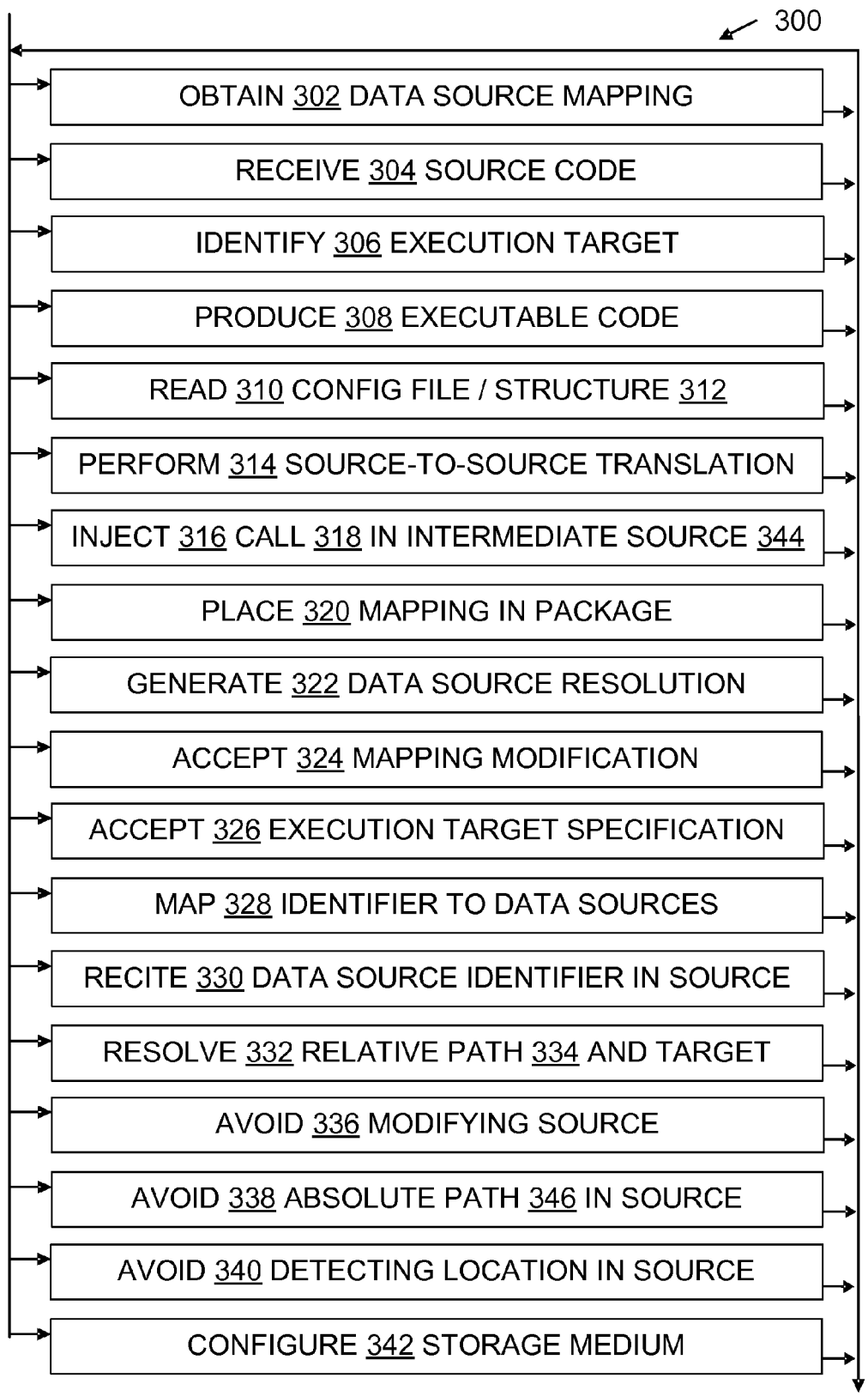
FIG. 3 is a flow chart illustrating steps of some process and configured storage medium embodiments.

With reference to FIGS. 1 to 3, some embodiments provide a computer system 102 with a logical processor 110 and a memory medium 112 configured by circuitry, firmware, and/or software to transform a development environment, and more specifically to transform source code, by coordinating a single source code with multiple execution target data sources as described herein.

For example, some embodiments include a logical processor 110, a memory 112 in operable communication with the logical processor, and items which configure the memory 112. A data source mapping 202 residing in (and thus configuring) the memory 112 has at least one data source identifier 204 which is mapped to a plurality of different data sources 136 at respective different execution targets 208. In some embodiments, the data source mapping resides in memory 112 within a textual configuration file, a nontextual project property 220, another project-specific structure, and/or a user-specific structure, for example. A source code 122 (also referred to as the developer source code, since it is provided by the developer 104) residing in the memory 112 recites the data source identifier 204 as a data source 136.

An executable code producer 206 residing in the memory 112 has instructions 210, 116 which upon execution automatically produce at different times from the same developer source code 122 a plurality of different executable codes 124. Each of these executable codes 124 makes reference to a different one of the data sources, even though each of these executable codes was generated automatically from the identical source as the other executable codes.

Thus, the developer avoids burdens of managing details of different execution targets within the developer's source code 122. For example, the developer's source code 122 can be free of code for detecting execution location, and can be free of absolute path 346 data source identifiers. Code needed to tailor executables for specific targets 208 can be injected by a producer 206, e.g., to create intermediate source 344 for subsequent compilation, and/or as patches to executable code produced from the developer's source 122. With respect to injection, some embodiments use an intermediate source code 344 containing calls 318 that are not present in the developer source code, such as a folder creation call, a cloud container creation call, a file creation call.

In some embodiments, the executable code producer 206 includes a resolution API 212. The resolution API 2121 includes instructions 210 which upon execution by the processor will resolve a relative path 334 and an execution target 208 into a data source resolution 214 containing a physical path 346. In some embodiments, the executable code producer 206 includes a source-to-source translator 216 which creates intermediate source code 344.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

FIG. 3 illustrates some process embodiments in a flowchart 300. Processes shown in the Figures may be performed in some embodiments automatically, e.g., by an executable code producer 206 within an IDE 148, under control of a script, or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a mapping obtaining step 302, an embodiment obtains a data source mapping 202. Step 302 may be accomplished by reading a mapping 202 from a file or from a property set, and/or by other mechanisms, for example.

During a source code receiving step 304, an embodiment receives developer source code 122, e.g., by way of an IDE 148 editor, by reading code from a file, and/or by other mechanisms, for example.

During a target identifying step 306, an embodiment identifies at least one execution target 208 (also referred to as "execution location" or "execution context"). Step 306 may be accomplished by using built-in defaults and/or by accepting 326 a specification 218 from a user 104, for example.

During an executable code producing step 308, an embodiment automatically produces executable code 124 from developer source code 122, data mapping(s) 202, and target 208 specification(s) 218. Familiar compilation, linking, and other executable code generation mechanisms may be used, in cooperation with data source identifiers 204, resolution 332, resolution APIs 212, source-to-source translation 216, intermediate source code 344, and/or other mechanisms described herein to support managing multiple data sources at different targets while allowing developers to use a single source code 122.

During a configuration file reading step 310, which may be part of mapping obtaining step 302, an embodiment reads a data source mapping from a configuration file 132, using file system, networking, and/or other mechanisms. More generally, during step 310 an embodiment reads a data source mapping 202 from a structure 312, such as a configuration file, a project property 220, or a user-specific settings or environment structure, for example.

During a translation performing step 314, an embodiment automatically performs source-to-source translation to create an intermediate source code 344 from a developer-provided source code 122 by injecting declarations, calls 318, and/or other code which tailors the code to a particular execution location. Familiar syntactic mechanisms can be used, together with familiar semantic analysis adapted to perform as described herein.

During a code injecting step 316, which may occur as part of translation performing step 314, an embodiment automatically injects calls 318 and/or other source code into the developer source code 122 to form an intermediate source code 344 that contains target-specific details of data sources and their access mechanisms. Suitable code transformations are discussed herein, and examples are provided. Users are not burdened with the details, or even the existence, of the intermediate source code 344 in some embodiments.

During a mapping placement step 320, an embodiment places (e.g., writes, associates, adds) a data source mapping 202 in a distributable software package 222. The mapping 202 may be placed 320, e.g., in properties 220, in a header, or in a configuration or environmental variables file, using familiar writing mechanisms adapted to place data source mappings 202.

During a resolution generating step 322, which may be part of producing step 308, an embodiment automatically generates a data source resolution 322 from a data source mapping 202 and a developer source code 122. Step 322 may include resolving step 332 when the data source identifier 204 of the mapping 202 is used with a relative path 334 in the source code 122.

During a modification accepting step 324, an embodiment accepts from a user 104 through an editor or IDE (for example) a modification of a previously obtained 302 data source mapping. For example, a data source identifier 204 may be added, removed, or renamed; a target 208 may be added or removed; a data source physical location may be changed. Step 324 may include existence checks (e.g., whether a physical location or target exists), syntax checks (e.g., absence of URI or absolute path in a data source identifier), and/or other validity tests before the modification is accepted.

During a target specification accepting step 326, an embodiment accepts from a user 104 through an editor or IDE (for example) a specification of at least one change in target(s) 208, e.g., the addition of a target or the removal of a previously specified target.

During a mapping step 328, an embodiment (or a user manipulating aspects of an embodiment) maps an identifier 204 to execution target data source(s) 136, e.g., by creating or modifying a data source mapping 202.

During a reciting step 330, an embodiment (or a user manipulating aspects of an embodiment) recites (e.g., reads or writes) in developer source code 122 a data source identifier 204. A data source identifier 204 is an identifier which (a) identifies a data source 136 and (b) is not specific to a particular target's data source. Indeed, a data source identifier 204 cannot be used during execution as is—it must be mapped 328. Attempting to use an unmapped data source identifier 204 will lead to compile-time and/or run-time errors because details such as data source's physical location are missing from the data source identifier itself.

During a relative path resolving step 332, which may be part of a resolution generating step 322, a data source identifier that includes a relative path 334 is resolved into a data source resolution 214.

During a source modification avoiding step 336, which may be viewed as part of executable code producing step 308, as part of source code receiving step 304, and/or as part of a process which includes producing 308 code for multiple targets from a single received 304 source code 122, a user (and an embodiment) avoids modifying the user's copy of the source code 122. Thus, the user avoids burdens of providing or understanding target-specific data source implementation details.

During an absolute path avoiding step 338, which may be viewed as part of executable code producing step 308, as part of source code receiving step 304, and/or as part of a process which includes producing 308 code for multiple targets from a single received 304 source code 122, a user (and an embodiment) avoids using an absolute path 346 in the source code 122 to access a data source 136. Thus, the user avoids burdens of providing or understanding target-specific data source implementation details.

During a location detection code avoiding step 340, which may be viewed as part of executable code producing step 308, as part of source code receiving step 304, and/or as part of a process which includes producing 308 code for multiple targets from a single received 304 source code 122, a user (and an embodiment) avoids using source code 122 which attempts to detect the target location or to distinguish between targets 208 in order to access a desired data source 136. Thus, the user avoids burdens of providing or understanding target-specific data source implementation details.

During a memory configuring step 342, a memory medium 112 is configured by a data source mapping 202, a resolution API 214, other data source transformation instructions of an executable code producer 206, and/or otherwise in connection with using a single source code and a mapping to virtualize data sources at different execution locations as discussed herein.

The foregoing steps and their interrelationships are discussed in greater detail below, in connection with various embodiments.

Some embodiments provide a process for cooperatively managing a source code and multiple alternative computational data sources. The process includes obtaining 302 a data source mapping 202 in which a particular data source identifier 204 is mapped to a plurality of data sources 136 at respective execution targets 208. The process receives 304 a developer source code which recites 330 the data source identifier as a data source, identifies 306 a first execution target, and automatically produces 308 from the developer source code a first executable code 124. The first executable code is tailored to the first target; upon execution in the first execution target, the first code 124 will operate with the first execution target's mapped data source as the data source identified by the data source identifier 204 even though that source 136 was not expressly stated in the source code 122. After identifying 306 a second execution target having a different data source than the first execution target, the process automatically produces 308—from the same source code 122—a second executable Input/, \\fileshare\TeamFolder\MyInput\, etc. are data sources, and Local, Cluster, and Cloud are execution locations:

| Name | Local Execution | Cluster Execution | Cloud Execution |
|---|---|---|---|
| INPUT | d:/MyData/Input/ | \\fileshare\TeamFolder\MyInput\ | http://myaccount.blob.core.windows.net/Data/ |
| TEMP | d:/MyData/Temp/ | \\fileshare\TeamFolder\Temp\ | http://myaccount.blob.core.windows.net/Temp/ | code which is tailored to the second target. That is, upon execution in the second execution target the second code 124 will operate with the second execution target's mapped data source as the identified data source instead of the first execution target's data source.

Many variations are contemplated. Some embodiments include obtaining 302 a data source mapping by reading a textual configuration file, or by reading a nontextual project property. In some embodiments, the receiving step receives 304 developer source code 122 which is free of (i.e., avoids 338) absolute path data source identifiers. In some embodiments, the execution target identifying steps identify 306 at least two of the following: a local execution target, a cluster execution target, a cloud execution target. In some embodiments, automatically producing 308 from the same developer source code a second executable code includes performing 314 a source-to-source translation which injects 316 at least one of the following calls 318: a folder creation call, a cloud container creation call, a file creation call. Some embodiments include placing 320 the data source mapping 202 in a distributable software package 222.

From a developer experience perspective, some embodiments include obtaining 302 a data source mapping in which a particular data source identifier is mapped to a plurality of data sources at respective execution targets, and automatically generating 322 from the data source mapping 202 and a source code 122 at least two different data source resolutions 214 for respective different execution targets, without requiring (i.e., avoiding 336) any change to the source code 122 by the developer.

Again, variations are contemplated. In some embodiments, obtaining 302 includes reading 310 the data source mapping from a project-specific structure. In some, the generating step generates 322 at least one data source resolution 214 containing a Universal Resource Identifier (URI). In some, the generating step generates 322, 332 at least one data source resolution based on a relative path 334 that is rooted at the data source identifier. In some embodiments, the generating step 322 encompasses more than mere substitution of physical storage location identifier strings; e.g., calls 318 may be injected 316.

In some embodiments, the process further includes accepting 324 a modification of the data source mapping from the developer 104. Some embodiments include accepting 326 a specification of the execution targets from the developer, in which case at least one of the execution targets may include a plurality of computing devices, e.g., a cluster or a cloud as target.

An INPUT TEMP Example

As a non-limiting example, the following is presented to further illustrate possible embodiments.

Assume an embodiment obtains 302 a data source mapping 202 in which a data source identifier 204 is mapped 328 to a plurality of data sources 136 at respective execution locations (targets 208). For instance, in the following mapping 202, INPUT and TEMP are data source identifiers, d:/MyData/

Consistent with USPTO practice, please note that the addresses above, and all other literal URLs, URIs, directory paths, apparent hyperlinks, and other data source addresses in this patent document are intended solely as examples. They are not meant to be followed to reach some other document, and they are not meant to incorporate any information into this document by reference.

In this example, the embodiment receives 304 source code which recites the data source identifier as a data source, e.g.,

```
foreach (file f in TEMP)
{
    do_things(f);
}
```

Continuing the example, the embodiment also identifies 306 a first execution location, e.g., Local. The embodiment automatically produces 308 from the source code a first executable code which upon execution in the first execution location will operate with the first execution location's mapped data source as the data source, e.g., as though the source code actually received had instead been the following equivalent source code:

```
folder TEMP = new folder("d:/MyData/Input/");
foreach (file f in TEMP)
{
    do_things(f);
}
```

The embodiment identifies 306 a second execution location, e.g., Cluster, and automatically produces 308 from the same source code a second executable code which upon execution in the second execution location will operate with the second execution location's mapped data source as the data source, e.g., as if the received source code had instead been the following equivalent source code:

```
folder TEMP = new folder("\\fileshare\TeamFolder\MyInput\");
foreach (file f in TEMP)
{
    do_things(f);
}
```

In considering this example, one might wrongly assume that the only difference in between Local equivalent source code and Cluster equivalent source code is the string value passed in the first line as the parameter of "new folder( )". That is, at first glance it might seem that a global string variable TEMP_DATA_SOURCE could have been used to get the same results, by setting TEMP_DATA_SOURCE="d:/MyData/Input/" or setting TEMP_DATA_SOURCE="\\fileshare\TeamFolder\Myinput\", e.g., by using a command line parameter. However, further scrutiny reveals that simply setting a string will not generate the code to create a new folder( ). In addition, a string variable is not powerful enough to provide the functionality of equivalent source for Cluster execution, because that involves not merely a different string but also involves creating and accessing a blobcontainer instead of a folder.

One way to implement the foregoing is to transform the developer's source S-original (source code 122) into execution-location-dependent source S-dependent (intermediate source code 344) and then compile the transformed source S-dependent. A preprocessor could be used as part of a source-to-source translator 216 in some cases.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as data source mappings 202, executable code producers 206 and resolution APIs 212, in the form of data 118 and instructions 116, read from a removable medium 114 and/or another source such as a network connection, to form a configured medium. The configured medium 112 is capable of causing a computer system to perform process steps for transforming data through data source management as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments provide an abstraction mechanism, also known as a virtualization. The virtualization could include a project setting or user setting which contains a data mapping 202. In some approaches, a setting file is automatically created for each project 150; an existing user setting could be imported to the file. The setting file could contain an arbitrary number of reference items and several execution locations. For each of the reference items, the setting file mapping 202 has a name (e.g., identifier 204) to represent this data reference, and a physical data source (e.g., absolute path 346) for each execution location.

The mapped data sources 136 could come from different data providers, as in the INPUT TEMP example above. When coding, the user reads/writes the data by referencing the name, e.g., "INPUT" or "TEMP". If the data source 136 has a hierarchy, the user can reference the data using a relative path 334, such as "INPUT/OrderData". If the user needs to repeat an operation on all the data from the source, the user could iterate through the data source 136 by writing code 122 such as "foreach (file f in TEMP) do_things(f);" or "foreach (file f in INPUT/OrderData) do_things(f);", as the case may be.

When building the project 150, the user chooses one of the execution targets. The building system then translates (maps, resolves) the name in the source code into the corresponding physical source according to the setting file mapping 202, with appropriate mappings between different data providers.

For example, assume the following source code 122:

```
foreach (file f in TEMP)
{
    do_things(f);
}
```

From this same source 122, a producer 206 might produce executable codes 124 based on which target 208 is specified. Thus, for the Local target the executable could correspond to this intermediate source 344:

```
folder TEMP = new folder("d:/MyData/Input/");
foreach (file f in TEMP)
{
    do_things(f);
}
```

For the Cluster target:

```
folder TEMP = new folder("\\fileshare\TeamFolder\MyInput\");
foreach (file f in TEMP)
{
    do_things(f);
}
```

For the Cloud target:

```
Blobcontainer TEMP = new
    blobcontainer(http://myaccount.blob.core.windows.net/Temp/");
foreach (blob b in TEMP)
{
    file f = new file (b);
    do_things(f);
}
```

The following discussion is derived from Project Data Library (PDL) documentation. Project Data Library is a collection of software components and services designed by Microsoft Corporation. Aspects of the PDL software and/or documentation are consistent with or otherwise illustrate aspects of the embodiments described herein. However, it will be understood that PDL documentation and/or implementation choices do not necessarily constrain the scope of such embodiments, and likewise understood that PDL and/or its documentation may well contain features that lie outside the scope of such embodiments. In addition, although Microsoft® Azure™ cloud technology is used in examples, teachings and embodiments are not necessarily limited to that particular cloud technology (marks of Microsoft Corporation). It will also be understood that the discussion below is provided in part as an aid to readers who are not necessarily of ordinary skill in the art, and thus may contain and/or omit details whose recitation below is not strictly required to support the present disclosure.

A Project Data Library (PDL) feature is directed at providing seamless data access across client, cloud storage, and remote compute nodes without source code changes for remote execution. It includes a per-project abstraction (virtualization) of data references among local file storage, staging storage and file storage on compute nodes. The PDL on a local box can be referred to as local PDL and the PDL on a remote compute node can be referred as remote PDL.

Microsoft® Windows® 7 operating system software provides a Library which contains specific folders to store user contents, e.g., a "Music Library" and a "Document Library" (marks of Microsoft Corporation). In this case, a Library abstraction represents a logical grouping of several folders (one being a default write location). By contrast, PDL can support mappings across multiple storage and execution environments such as local file system, cloud storage and remote compute node's file system.

The PDL can map each folder in a local PDL with one container in staging storage at Azure™ blob storage (mark of Microsoft Corporation). For example, the local PDL could be mapped to a physical folder under a project space, and contain one file downloaded from a full dataset; the cloud PDL could be mapped to a container under the user's Azure™ storage; and the remote PDL could be mapped to a physical folder under a model deployment directory ("model" referring here to a computer program). The PDL transition across client, cloud, and cluster removes the physical nature of the cloud storage from the user's view, and users can concentrate on data and modeling. Therefore data references in executable code could use relative paths without hardcoding any absolute path, which supports model codes running without source code changes when ported from a local to remote execution environment.

In some approaches, data reference mapping supports Azure™ blob's shared access signature (SAS) URI as a staging storage address. Some approaches use two-level-deep directory structures within PDL, so the mapping between local PDL and Azure™ storage is straightforward using container and blobs at Azure™ storage end. For example, the folder name under local PDL will correspond to a container name and a file name under the folder will correspond to a blob. Some approaches focus on folder-level data reference mapping, i.e., mapping a local folder with the full contents under a container at Azure™ blob storage for the project data library, and do not map between a local folder and partial contents within a container. Hence, the files under one container are all included in the mapping. In some approaches, the project data library focuses on a per-project implementation, instead of a machine wide data library. Some versions of Azure™ blob storage support only a two-level-deep directory (container/blob), but one could work around that by naming blob with '/' to mimic a hierarchy structure (e.g. blob name is "folder/subfolder/name"). If the source code references "INPUT/folder/subfolder/blob", then the producer would map the blob "folder/subfolder/name" in a container mapped to "INPUT".

Some approaches assume that users 104 are aware of impacts of renaming, moving and deleting physical folders associated with the PDL. The changes outside the PDL will not be automatically synced with the PDL. Those mappings would be deleted and created again.

The design here can be also applicable beyond the three data reference targets 208 to adapt more storage targets (e.g., two HPC clusters) and multiple staging storages (e.g., two Azure™ storage accounts).

In some approaches, the full path for the remote compute node will depend on the deployment directory, which will be retrieved via a program runtime, and the mapping 202 only keeps track of a relative path under the deployment directory.

In some approaches, each row in a mapping 202 table represents a data reference mapping. The PDL includes the union of data reference mappings, and provides APIs to provide data reference translations across different environments. The mapping name would be the display name of a data folder under the PDL, and it would be the folder name by default.

In the cloud storage, some approaches only track the container's full URI; the storage account name and keys will not be stored in the PDL. The storage account name and keys will be stored at client side's user setting. When a SAS policy is associated with an Azure™ blob container in a data reference mapping, the specific SAS policy beyond the container name would be also included in the mapping information.

In some approaches, all data reference mapping information included in the PDL is persisted at a project level, so it can be included into the package 222 when it is run on a remote HPC cluster. The PDL information could be persisted as an XML like config file 132, e.g., DataLib.pdl containing all data reference mappings, or as multiple config files with one file for each data reference mapping, or as a project property 220 inside a project. When the data reference mapping is registered into the project system or other persistent storage for a project 150, it is to be accessible by build code during a program packaging phase. Therefore the corresponding data reference information on cloud staging storage and remote compute node data download can be included in the package.

In some approaches, the PDL provides data reference resolution to provide a physical path given a relative path under PDL. When one returns the data reference resolution locally, the PDL knows the full path of the root directory in the mapping. Therefore one can return the concatenated string for the full path.

However, the PDL doesn't know the remote root directory but only the folder name under the model (program) deployment directory. The program deployment directory is only known at program runtime, and the code emitted doesn't know that in the compile time. Various approaches can be used to resolve the full path on the remote compute node at program runtime since there is no compilation on remote node. For example, one may create a file for each mapping's local target's directory, e.g., "C:\BATS" for batsmapping. config and the file would be in the root directory of running load_csv. The file will be created on remote node when data is loaded for the mapping. Alternately, one could register an environment variable for the local root directory for local target for each mapping.

Some approaches use the following API to resolve the data references across different environments.

```
namespace Microsoft.Wcs.Data
{
    /// This represents Data Access API requirements for PDL component
    public interface IDataLibrary
    {
        /// Returns physical path of an item, given its virtual path and
             data context
        /// For example, let's say mapping "c:\data" with name "data" is
             registered in
    PDL.
        /// Then, virtual path "\data\a.txt" maps to physical path
             "c:\data\a.txt"
```

```
            /// in the local context, and to "baseUri/data/a.txt" in cloud
        context
            string GetPhysicalPath(VirtualPath relativePath, string
        executionTargetName);
        }
}
```

Some approaches use the following class design for the data reference mapping, which represents a mapping across local PDL, staging storage and remote PDL. Note that the ExecutionTarget and VirtualPath classes will be shared between data access APIs and the PDL library.

```
namespace Microsoft.Wcs.Data
{
    /// Represent a mapping between local PDL, Azure storage (staging
    storage) and remote PDL
    public class DataReferenceMapping {
        private string _name;
        private Dictionary<string, StorageTarget> _targets;
        private DataReferenceMapping( ) {
            _targets = new Dictionary<string, StorageTarget>( );
        }
        public DataReferenceMapping(string name) {
            _name = name;
            _targets = new Dictionary<string, StorageTarget>( );
        }
        public DataReferenceMapping(string name, StorageTarget
        target) {
            _name = name;
            _targets = new Dictionary<string, StorageTarget>( );
            if (target != null) {
                _targets.Add(target.Name, target);
            }
            else {
                throw new ArgumentNullException( );
            }
        }
        /// Initialize data reference mapping with the unique mapping
    name and copying from a dictionary
        public DataReferenceMapping(string name, IDictionary<string,
    StorageTarget> targetLists) {
            _name = name;
            if (targetLists != null) {
                _targets = new Dictionary<string,
            StorageTarget>(targetLists);
            }
            else {
                throw new ArgumentNullException( );
            }
        }
        /// The unique name of the mapping
        public string Name {
            get { return _name; }
            set { _name = value; }
        }
```

As an aside before continuing the code, note that the ExecutionTarget and VirtualPath classes will be shared between data access APIs and the PDL library.
The code continues:

```
        /// dictionary of the key of the unique storage target name and
    details of
        /// execution target. Each execution target will have a unique
    name as key
        /// and StorageTarget instance will include details of the storage
    information
        //[XmlIgnore]
        //public Dictionary<string, StorageTarget> Targets { get { return
    _targets; } }
        [XmlArray("Targets")]
        [XmlArrayItem("Target")]
        public List<StorageTarget> Targets {
            get {
                if (_targets != null) {
                    return _targets.Values.ToList( );
                }
                else {
                    throw new ArgumentNullException( );
                }
            }
            set {
                if (value != null) {
                    foreach (StorageTarget st in value) {
                        _targets.Add(st.Name, st);
                    }
                }
            }
        }
        public void AddTarget(StorageTarget target) {
            if (target != null) {
                _targets.Add(target.Name, target);
            }
            else {
                throw new ArgumentNullException( );
            }
        }
        public void RemoveTarget(string targetName) {
            if (targetName != null) {
                _targets.Remove(targetName);
            }
            else {
                throw new ArgumentNullException( );
            }
        }
    }
}
```

With some approaches, each storage target will represent a storage reference on an execution environment, a staging data target or a result persistent storage. The base class for storage target is as follows, with each specific target such as local file system target, Azure™ blob staging storage, remote target, result's persistent storage.

```
namespace Microsoft.Wcs.Data
{
    /// The execution or storage environment reference. E.g., a full path
    of file
    /// folder at local file system, a blob absolute uri for Azure storage
    with associated SAS
    /// policies, and folder name for remote compute node's data
    deployment.
    /// Note that "ExecutionTarget" name is subject to change.
    public class StorageTarget {
        private string _name;
        private StorageTargetType _type;
        private StorageTarget( ) {
        }
        public StorageTarget(string name, StorageTargetType type) {
            _name = name;
            _type = type;
        }
        public string Name {
            get { return _name; }
            set { _name = value; }
        }
        public StorageTargetType TargetType {
            get { return _type; }
            set { _type = value; }
        }
    }
}
```

Some approaches, also use a VirtualPath class which represents the local folder (relative path) under PDL:

```
namespace Microsoft.Wcs.Data
{
    // It's basically relative path string under the PDL
    // a strong type to provide some helpers to facilitate
    // and validate operations on relative path string.
    public class VirtualPath {
        public string Value { get; set; }
    }
}
```

In some approaches, the following is the class design for the PDL which maintains all data reference mappings across 3Cs (that is, across client, cluster, and cloud).

```
namespace Microsoft.Wcs.Data
{
    /// The class to represent the project data library
    public class ProjectDataLibrary : IDataLibrary {
        private Dictionary<string, DataReferenceMapping>
_dataReferenceMappings;
        private string _filePath;
        private string _version;
        /// Initialize an empty PDL
        public ProjectDataLibrary( ) {
            _dataReferenceMappings = new Dictionary<string,
DataReferenceMapping>( );
        }
        /// Initialize an PDL with one mapping
        public ProjectDataLibrary(DataReferenceMapping mapping) {
            _dataReferenceMappings = new Dictionary<string,
DataReferenceMapping>( );
            if (mapping != null) {
                _dataReferenceMappings.Add(mapping.Name,
                    mapping);
            }
            else {
                throw new ArgumentNullException( );
            }
        }
        /// Initialize a PDL with multiple mappings
        public ProjectDataLibrary(IDictionary<string,
DataReferenceMapping>
mappings) {
            if (mappings != null) {
                _dataReferenceMappings = new Dictionary<string,
DataReferenceMapping>(mappings); ;
            }
            else {
                throw new ArgumentNullException( );
            }
        }
        /// The full path for PDL file
        public string FilePath {
            get { return _filePath; }
            set { _filePath = value; }
        }
```

Before continuing the code, as an aside note that in this and some other code listings herein, tags such as the following have been removed to condense the listing space:

```
/// </summary>
/// <param name="mapping"></param>
```

White space has also been removed to condense the listing space. The code continues:

```
public string Version {
    get { return _version; }
    set { _version = value; }
}
```

```
    }
    /// All data reference mappings
    [XmlIgnore]
    public Dictionary<string, DataReferenceMapping>
DataReferenceMappings
    {
        get { return _dataReferenceMappings; }
        set { _dataReferenceMappings = value; }
    }
    [XmlArray("Mappings")]
    [XmlArrayItem("Mapping")]
    public List<DataReferenceMapping> Mappings {
        get { return _dataReferenceMappings.Values.ToList( ); }
        set {
            if (value != null)
            {
                foreach (DataReferenceMapping m in value) {
                    _dataReferenceMappings.Add(m.Name, m);
                }
            }
        }
    }
    /// Add a data reference mapping into PDL
    public void AddDataReference(DataReferenceMapping
mapping) {
        if (!_dataReferenceMappings.ContainsKey(mapping.Name)) {
            _dataReferenceMappings.Add(mapping.Name, mapping);
        }
    }
    /// Return the resolved physical path for a PDL virtual path
    public string GetPhysicalPath(VirtualPath relativePath, string
storageTargetName) {
        return storageTargetName;
    }
    /// Remove a data reference mapping out of PDL
    public void RemoveDataReference(DataReferenceMapping
mapping) {
        if (_dataReferenceMappings.ContainsKey(mapping.Name))
        {
            _dataReferenceMappings.Remove(mapping.Name);
        }
    }
    /// Serialize PDL into the file as specified in FilePath
    public void Save( ) {
    }
    /// Reading PDL from the file as specified in FilePath
    public void Load( ) {
    }
}
```

Several approaches may be used to persist the PDL information (e.g., mapping 202) at client side. One can use an XML-like config file to include PDL information and add the config file into project. Alternately, one can modify a project management system to add PDL information as project properties 220 which can be entered and edited via right clicking the project file and choosing properties. Another option is to leverage the client infrastructure's IPropertyCollection interface In some approaches, a data reference mapping 202 is saved as an XML file, e.g., like a DataLib.pdL file. Some approaches assume that users can create and edit mappings in this file, and that this file can be added into a project using an IDE 148. The PDL XML can be generated using DataContractSerializer and corresponding element names will be added as attributes in the C# class definition.

```xml
<?xml version="1.0" encoding="utf-8"?>
<ProjectDataLibrary xmlns:i="http://www.w3.org/2001/XMLSchema-instance"
        xmlns="http://schemas.datacontract.org/2004/07/Microsoft.Wcs.Data">
    <DataReferenceMappings>
        <DataReferenceMapping>
            <Name>mapping</Name>
            <Details>
                <Name>mapping</Name>
                <StorageTargets>
                    <StorageTarget>
                        <Name>local</Name>
                        <Details i:type="LocalFileSystemTarget">
                            <Name>local</Name>
                            <RootDirectory>C:\</RootDirectory>
                        </Details>
                    </StorageTarget>
                    <StorageTarget>
                        <Name>cloud</Name>
                        <Details i:type="AzureBlobsStagingTarget">
                            <Name>cloud</Name>
                            <AccountName>myaccount</AccountName>
                            <ContainerName>mycontainer</ContainerName>
                            <SharedAccessPolicyNames>
                                <Name>read</Name>
                            </SharedAccessPolicyNames>
                        </Details>
                    </StorageTarget>
                </StorageTargets>
            </Details>
        </DataReferenceMapping>
    </DataReferenceMappings>
</ProjectDataLibrary>
```

As to running locally, assume a user writes source code reciting an identifier 204, such as load_csv(dataref ("BATS\a.csv")). In some approaches, a dataref looks for the data reference mapping information for local in the project data library, translates the path, then calls load_csv("c:\data\BatsData\a.csv"). For example, a dataref ("BATS\a.csv") could be translated into a function which accesses the PDL mapping information as follows. The local root directory for this mapping will be inline in the function emitted for local running.

```
function dataref(path)
        root = "C:\BATS"; // return root directory for BATS local target
        return root & path; // concatenation of root directory for BATS
            and virtual path
end
```

When packaging for the cloud, some approaches pack the pdl file into the package 222. When packaging for the remote compute node execution using Azure™ storage as staging storage, one may create another pdl file with a SAS URI for data security. The SAS generation will be triggered inside MSBuild, for example, and be transparent to users. To create this file, one replaces the cloud target's path with the SAS generated one; and replaces the local target's path with the expected location of the data on the compute node. If it is known where the program will be unpackaged, the data will be loaded under the same folder; if not, one can create a folder. One can create a new DataLib.pdl file which will be included into the package:

```xml
<?xml version="1.0" encoding="utf-8"?>
<ProjectDataLibrary xmlns:i="http://www.w3.org/2001/XMLSchema-instance"
        xmlns="http://schemas.datacontract.org/2004/07/Microsoft.Wcs.Data">
    <DataReferenceMappings>
        <DataReferenceMapping>
            <Name>mapping</Name>
            <Details>
                <Name>mapping</Name>
                <StorageTargets>
                    <StorageTarget>
                        <Name>cloud</Name>
                        <Details i:type="AzureSharedAccessBlobsStagingTarget">
                            <Name>cloud</Name>
                            <AccountName>myaccount</AccountName>
                            <ContainerName>mycontainer</ContainerName>
                <SharedAccessSignatureUri>http://xxxxxxx</SharedAccessPolicyNames>
                        </Details>
                    </StorageTarget>
                </StorageTargets>
            </Details>
        </DataReferenceMapping>
    </DataReferenceMappings>
</ProjectDataLibrary>
```

This DataLib.pdl is placed in the package with the program (a.k.a. model). During unpackaging at program runtime, one finds the DataLib_cloud.pdl. From the name, one knows one is to pull data from cloud to the local. So one goes to each SAS generated path, and pulls the data to the corresponding local path. In the data reference mapping, one knows the folder names, but not the full name. Data loading (which is a component outside PDL) will retrieve the root deployment directory and generate the full path for data destinations, e.g., using an extensibility framework.

As for running remotely, assume a user writes the same code load_csv(dataref("BATS\a.csv")) as above. A dataref looks for the mapping information for local in the DataLib_cloud.pdl, and translates the path, then calls load_csv("c:\deploymentroot\\TradingStrategy\BATS\a.csv"). An executable function for dataref will read batsmapping.config generated in a previous data loading phase to resolve the root directory for BATS mapping and dataref will return the concatenation of the root directory and virtual path passed from argument. Therefore the local path for a.csv can be resolved based on local file reference on remote compute nodes.

With regard to thread safety, in some approaches each project will have a separate PDL and the following operations on top of PDL: Add data reference mapping into in-memory PDL, Save in-memory PDL instance into file, Load PDL from file to in-memory PDL instance, Resolve physical path, Get data reference mapping. There is one in-memory PDL data structure per project which contains multiple data reference mappings, and there is also a persistent XML file which can be loaded into PDL in-memory structure. In some approaches, the PDL will be called in a data library explorer (DLE) for a user to add mapping into in-memory one (on client only), in MSBuild to get a mapping from an in-memory PDL (client only), and for data loading to load PDL/add mapping/save PDL (remote only). DLE and MSBuild would not simultaneously modify the PDL, so there is no contention for in-memory PDL or PDL file.

Some approaches provide the following functionality constraints. As for Creation, saving and loading of data library: Mapping and settings for the data library are to be correctly created, saved and loaded through public interfaces; Creating a new data library from constructors is to be supported; Saving the data library to file is to be supported; Loading the data library from persistent storage is to be supported; and Saving to or loading from a path which is invalid or does not exist is to be detected and avoided.

As for Adding new entries into PDL: a user could successfully register new unique entries into the PDL, and support provided for Adding new unique mapping entries into PDL, Adding duplicate mapping entry into PDL, Adding entries with same Azure™ storage path but a different local path, and Attempting to add new entries with same local path but different Azure™ storage.

As for Changing an existing PDL, a user would be able to load an existing PDL, do some changes and save it again, e.g., add some new entries, edit existing entries, delete existing entries.

As for naming of data folder, storage and blob, it will be understood that different targets may have different naming conventions and restrictions. The data library can check the file references to make sure they are valid. In some approaches, the library can return the correct mappings, resolved resource addresses or errors (if not within data library), as called for by user scenarios or to act accordingly on an error. Also, searching and resolving of a resource can be assumed to be repeatable and definitive, e.g., with functionality for resolving a local file, mapping to Azure™ storage resource URI, resolving a remote target, and resolving a resource within 2-level directories, for example.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for cooperatively managing a source code and multiple alternative computational data sources, the process comprising the steps of:
    obtaining a data source mapping in which a particular data source identifier is mapped to a plurality of data sources at respective execution targets;
    receiving a developer source code which recites the data source identifier as a data source;
    identifying a first execution target;
    automatically producing from the developer source code a first executable code which upon execution in the first execution target will operate with the first execution target's mapped data source as the data source identified by the data source identifier;
    identifying a second execution target having a different data source than the first execution target; and
    automatically producing from the same source code a second executable code which upon execution in the second execution target will operate with the second execution target's mapped data source as the identified data source instead of the first execution target's data source.

2. The process of claim 1, wherein the step of obtaining a data source mapping comprises at least one of the following: reading a textual configuration file, reading a nontextual project property.

3. The process of claim 1, wherein the receiving step receives developer source code which is free of absolute path data source identifiers.

4. The process of claim 1, wherein the execution target identifying steps identify at least two of the following: a local execution target, a cluster execution target, a cloud execution target.

5. The process of claim 1, wherein the step of automatically producing from the same developer source code a second executable code comprises performing a source-to-source translation which injects at least one of the following: a folder creation call, a cloud container creation call, a file creation call.

6. The process of claim 1, further comprising placing the data source mapping in a distributable software package.

7. A computer-readable storage medium configured with data and with instructions that when executed by at least one processor causes the processor(s) to perform a process for use by a developer, the process comprising the steps of:
    obtaining a data source mapping in which a particular data source identifier is mapped to a plurality of data sources at respective execution targets; and
    automatically generating from the data source mapping and a source code at least two different data source resolutions for respective different execution targets, without requiring any change to the source code by the developer.

8. The configured medium of claim 7, wherein one of the data sources mapped to the data source identifier contains less than ten gigabytes of data and another of the data sources mapped to the data source identifier contains at least one hundred gigabytes of data.

9. The configured medium of claim 7, wherein the generating step generates at least one data source resolution containing a Universal Resource Identifier.

10. The configured medium of claim 7, wherein the generating step generates at least one data source resolution based on a relative path rooted at the data source identifier.

11. The configured medium of claim 7, wherein the generating step encompasses more than mere substitution of physical storage location identifier strings.

12. The configured medium of claim 7, wherein the process further comprises accepting a modification of the data source mapping from the developer.

13. The configured medium of claim 7, wherein the process further comprises accepting a specification of the execution targets from the developer, and at least one of the execution targets includes a plurality of computing devices, and a mapped data source for that execution target contains at least one terabyte of data.

14. A computer system comprising:
    a logical processor;
    a memory in operable communication with the logical processor;
    a data source mapping residing in the memory and having a particular data source identifier which is mapped to a plurality of different data sources at respective different execution targets;
    a developer source code residing in the memory and having the data source identifier recited as a data source within the developer source code; and
    an executable code producer residing in the memory and having instructions which upon execution automatically produce at different times from the same developer source code a plurality of different executable codes, each executable code making reference to a different one of the data sources.

15. The system of claim 14, wherein the developer source code is free of code for detecting execution location.

16. The system of claim 14, wherein the developer source code is free of absolute path data source identifiers.

17. The system of claim 14, further comprising an executable code produced by the executable code producer, the executable code containing at least one of the following not present in the developer source code: a folder creation call, a cloud container creation call, a file creation call.

18. The system of claim 14, wherein the executable code producer comprises a resolution API, the resolution API including instructions which upon execution by the processor will resolve a relative path and an execution target into a data source resolution containing a physical path.

19. The system of claim 14, wherein the executable code producer comprises a source-to-source translator.

20. The system of claim 14, wherein the data source mapping resides in at least one of the following: a textual configuration file, a nontextual project property, a project-specific structure, a user-specific structure.

* * * * *